(12) United States Patent
Le Cunff et al.

(10) Patent No.: US 7,520,330 B2
(45) Date of Patent: Apr. 21, 2009

(54) SYSTEM AND METHOD FOR LIMITING VORTEX-INDUCED VIBRATIONS ON AN OFFSHORE PRODUCTION RISER

(75) Inventors: Cédric Le Cunff, Paris (FR); Daniel Averbuch, Rueil Malmaison (FR); Marie-Hélène Klopffer, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 171 days.

(21) Appl. No.: 11/522,903

(22) Filed: Sep. 19, 2006

(65) Prior Publication Data

US 2007/0012452 A1    Jan. 18, 2007

Related U.S. Application Data

(63) Continuation of application No. 10/289,180, filed on Nov. 7, 2002, now Pat. No. 7,128,159.

(30) Foreign Application Priority Data

Nov. 16, 2001   (FR) ................................. 01 14814

(51) Int. Cl.
*E21B 29/12* (2006.01)
(52) U.S. Cl. ..................... 166/350; 166/367; 405/224.4
(58) Field of Classification Search ................ 166/335, 166/350, 346, 359, 367, 354, 352, 355; 405/224.4, 405/224.2; 175/7, 8; 114/264
See application file for complete search history.

(56) References Cited

U.S. PATENT DOCUMENTS

| | | | |
|---|---|---|---|
| 3,142,343 A | 7/1964 | Otteman |
| 3,410,096 A | 11/1968 | Schuh |
| 3,503,460 A | 3/1970 | Gadbois |
| 3,528,497 A | 9/1970 | Lehman |
| 4,114,393 A | 9/1978 | Engle et al. |
| 4,351,027 A | 9/1982 | Gay et al. |
| 4,423,983 A | 1/1984 | Dadiras et al. |
| 4,576,516 A | 3/1986 | Denison |
| 4,616,708 A | 10/1986 | de Mota |
| 4,617,998 A | 10/1986 | Langner |
| 4,633,801 A | 1/1987 | Marshall |
| 4,733,991 A | 3/1988 | Myers |
| 4,787,778 A | 11/1988 | Myers et al. |
| 4,883,387 A | 11/1989 | Myers et al. |
| 5,160,219 A | 11/1992 | Arit |
| 5,479,990 A | 1/1996 | Peppel |
| 6,190,091 B1 | 2/2001 | Byle |

(Continued)

FOREIGN PATENT DOCUMENTS

GB    2156401    10/1985

(Continued)

*Primary Examiner*—Thomas A Beach
(74) *Attorney, Agent, or Firm*—Antonelli, Terry, Stout & Kraus, LLP.

(57) ABSTRACT

The present invention relates to a method and to a system for limiting vortex-induced vibrations on a riser suspended at one end from a support and subjected to substantially transverse fluid flows. The system comprises suspension means (10) for hanging the riser from the support, which include displacement means for moving the end in a transverse direction in relation to the principal axis of the riser.

2 Claims, 3 Drawing Sheets

U.S. PATENT DOCUMENTS

| | | |
|---|---|---|
| 6,257,356 B1 | 7/2001 | Wassell |
| 6,568,470 B2 | 5/2003 | Goodson et al. |
| 6,571,878 B2 | 6/2003 | McDaniel et al. |
| 6,585,455 B1 | 7/2003 | Petersen et al. |
| 6,619,388 B2 | 9/2003 | Dietz et al. |
| 6,685,394 B1 | 2/2004 | Allen et al. |
| 6,691,784 B1 | 2/2004 | Wanvik |
| 7,128,159 B2 * | 10/2006 | Le Cunff et al. ............ 166/355 |

FOREIGN PATENT DOCUMENTS

| | | |
|---|---|---|
| GB | 2156407 | 10/1985 |
| WO | WO 00/47862 | 8/2000 |
| WO | WO 01/71153 | 9/2001 |

\* cited by examiner

SYSTEM AND METHOD FOR LIMITING VORTEX-INDUCED VIBRATIONS ON AN OFFSHORE PRODUCTION RISER

CROSS-REFERENCE TO RELATED APPLICATION

This application is a continuation application of U.S. application Ser. No. 10/289,180, filed Nov. 7, 2002, now U.S. Pat. No. 7,128,159, the contents of which are incorporated herein by reference.

FIELD OF THE INVENTION

The present invention relates to the sphere of risers subjected to vibrations induced by the currents present in the water depth crossed through by said risers. It finds its application mainly in offshore oil field development.

BACKGROUND OF THE INVENTION

When a fluid flows around a structure, vortexes whose frequency and even whose appearance are governed by the characteristics of the fluid (velocity, viscosity, density) and of the structure (diameter) may appear. These vortexes excite the structure which starts vibrating and can therefore break due to fatigue failure. The flow of the fluid reaching a cylinder creates vortexes in the fluid situated behind the cylinder, in relation to the direction of flow. These vortexes push the cylinder transversely and cause the structure to move periodically. A <<locking-on>> phenomenon appears then: the natural mode of the structure, whose frequency is close to the <<vortex release>> frequency, influences this <<release>> frequency which tends to become equal to the frequency of the natural mode. The cylinder is then excited at one of its natural frequencies. The response of the cylinder under vibration will thus be dominated by the form of the natural mode.

This type of phenomenon, called VIV (Vortex-Induced Vibration), is notably observed in marine structures comprising petroleum effluent production or drilling risers. In the case of a riser, this phenomenon has to be taken into account for calculating the lifetime, because it can induce considerable structure damage, notably under deep sea conditions, in particular for catenary type risers (SCR).

SUMMARY OF THE INVENTION

The present invention thus relates to a system for limiting vortex-induced vibrations on a riser suspended at one end from a support and subjected to substantially transverse fluid flows. The system comprises means for suspending the riser from said support, which include displacement means for moving said end in a transverse direction in relation to the principal axis of said riser.

The displacement means can be suited to allow displacement of said end in all directions.

The transverse displacement means can include spring type passive elements having a determined stiffness.

The transverse displacement means can include passive elements having a determined damping characteristic.

The passive elements can include magneto-rheological material elements.

The transverse displacement means can also include active elements for applying a transverse displacement to said end.

The active elements can comprise means for controlling and or adjusting the displacements according to the induced vibrations.

The invention also relates to a method for limiting vortex-induced vibrations on a riser suspended at one end from a support and subjected to substantially transverse fluid flows. According to the method, said riser is suspended from said support by means allowing displacement of said end in a transverse direction in relation to the principal axis of said riser.

The stiffness and/or damping of said means allowing displacements can be determined according to the induced vibrations.

Said end can be displaced by means of active means according to the induced vibrations.

Said end can be displaced at a determined velocity according to the induced vibrations.

BRIEF DESCRIPTION OF THE DRAWINGS

Other features and advantages of the present invention will be clear from reading the description hereafter of an embodiment, given by way of non limitative example, with reference to the accompanying drawings wherein.

DETAILED DESCRIPTION

In order to overcome this vortex-induced vibration problem, and thus to increase the lifetime of the structure, two approaches can be considered modes change;

disappearance of the locking-on phenomenon.

The first solution takes account of the fact that fatigue depends on the frequency of the modes and on their form (since the response of the structure is dominated by its modes). If the modal base is changed, the excited mode is changed as well and it is therefore possible to decrease the fatigue either by decreasing the frequency of the locked-on mode, or by displacing along the structure the fatigue maxima which correspond to the maxima of the modes.

The second solution involves the fact that locking-on is a phenomenon which implies that the current is constant in time to keep steady. If the current is sufficiently disturbed, the vortex release frequency will be modified and the locked-on mode will no longer be excited.

A) Example of Application of the First Fatigue Reduction Type

This example relates to a riser placed in a current that varies with the water depth but which is time-independent. The characteristics of the riser are as follows:

| | |
|---|---|
| Length | 300 m |
| Outside diameter | 0.25 m |
| Inside diameter | 0.235 m |
| Linear weight | 157.8 kg/m |
| Head tension | 1469 kN |

The characteristics of the current are

| Depth (m) | 0 | 60 | 260 | 300 |
|---|---|---|---|---|
| Velocity (m/s) | 0.6 | 0.8 | 0.2 | 0.1 |

The riser is kept under tension at its upper end. The conventional layout is a riser suspended at the head by means allowing a toggle type motion.

Figure 1:
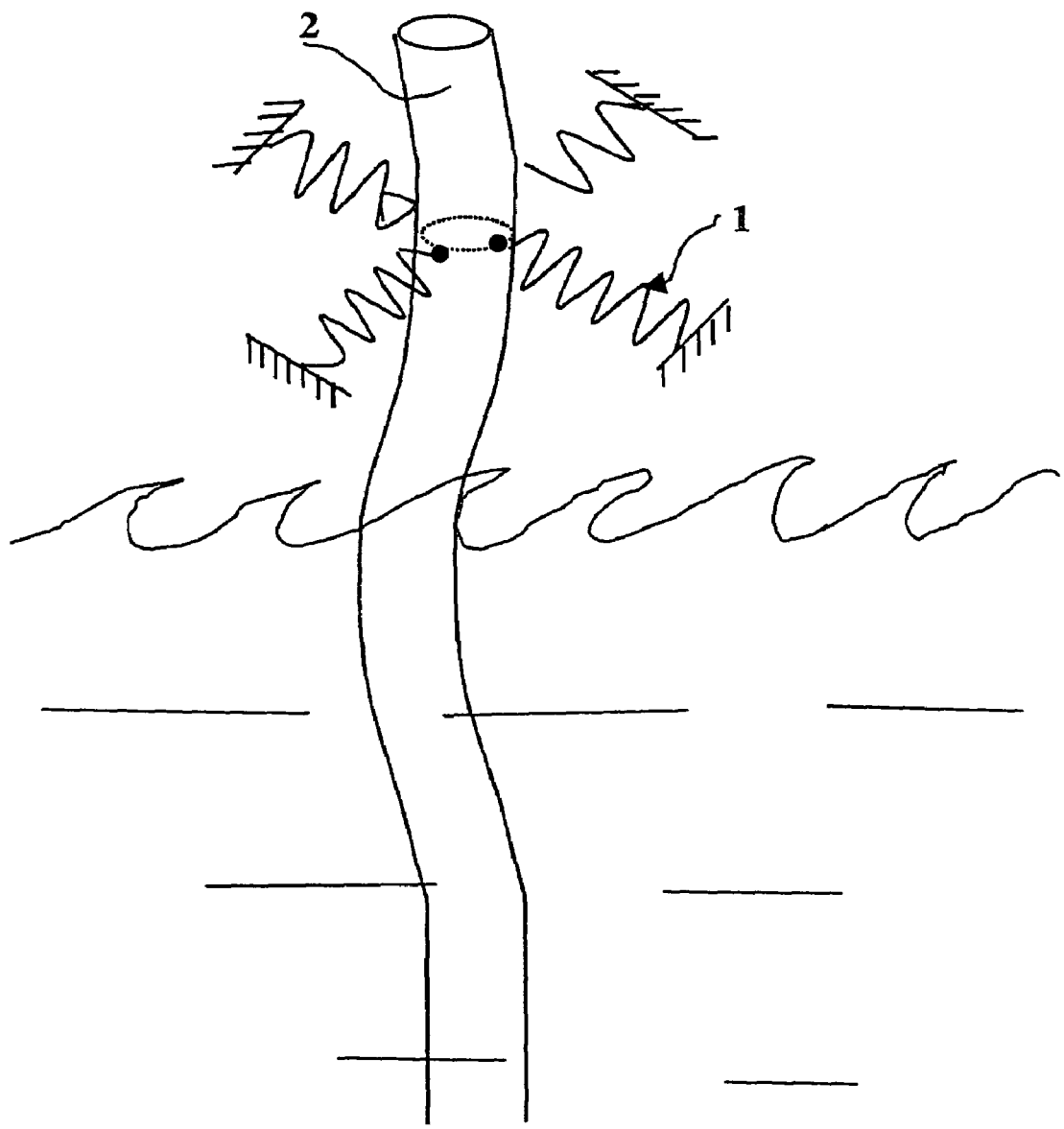
FIG. 1 illustrates a principle according to the invention.

The purpose is here to be able to change the modes. According to the invention, illustrated by FIG. 1, a system of spring type means 1 intended to control the displacements is installed on the most accessible upper part 2 of the riser. The change consists in allowing a substantially horizontal motion of the locked-on part through the agency of means having a certain stiffness, the springs being arranged transversely to the current.

Figure 2:
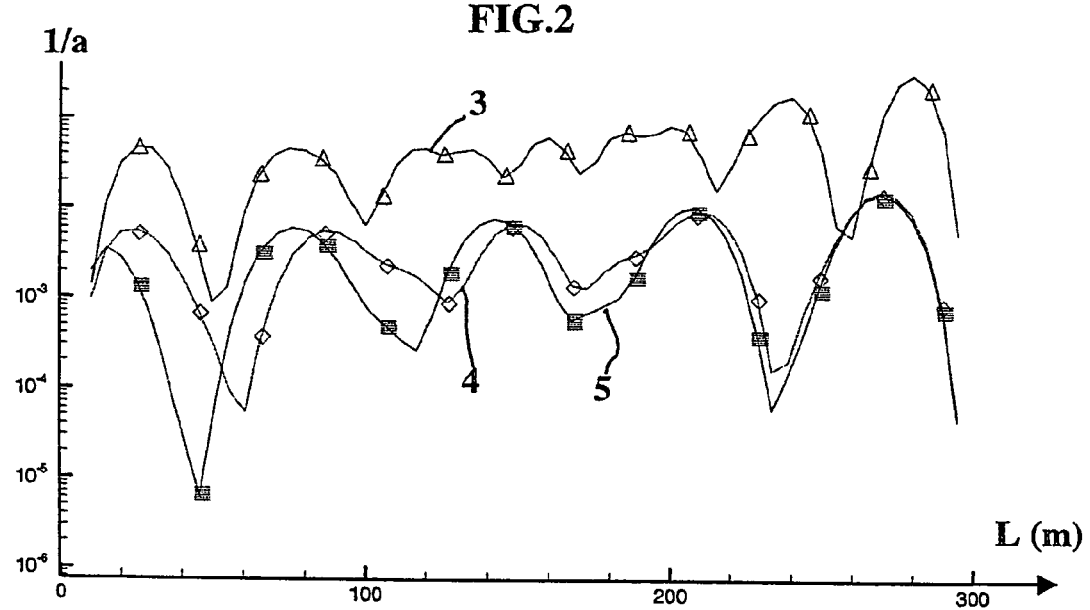
FIG. 2 shows the significance of an embodiment according to the invention.

The vibration modes then depend on the stiffness of the displacement control means of spring type for example. A fatigue calculation shows that the lifetime can be increased in this precise case by exciting a lower frequency mode. FIG. 2 illustrates this phenomenon and shows the computation results obtained by means of the Deep VIV software (a software marketed by the French company Principia).

The inverse (1/a) of the lifetime (in years) of the constituent material of a section located at a distance L (in meters) from the top of the riser is represented on the ordinate. To that effect, the amplitude of the stresses to which the riser is subjected and the frequencies at which the vibrations occur are calculated. By plotting on a fatigue strength curve relative to the riser constituent material the amplitude of the stress variations indicating the number of allowable cycles, the lifetime along the riser can be deduced, knowing the frequency of appearance of these stress cycles and the number of allowable cycles. Thus, in FIG. 2, the higher the curve on the ordinate, the shorter the lifetime at this point of the riser. Of course, it is the minimum value of the lifetime (i.e. the maximum value of the curve) which dimensions the riser.

For a great stiffness (curve 3–stiffness=$10^6$ N/m), the riser does not move at the top, which is thus an equivalent of the locked-on riser. Then the stiffness is reduced (curves 4 and 5), which progressively releases the horizontal motions of the riser head. The modes are then changed and more favourable lifetimes are obtained. One thus changes from a lifetime below 10 years, for a riser locked at the head, to about 100 years for stiffness values of the order of $10^4$ N/m (curve 4).

It can be noted that, in this case, the spring playing a fundamental role is the one arranged perpendicular to the plane of the riser and of the current, i.e. in the plane of the vibrations.

Moreover, it is clear that the values of the calculated optimum stiffness are compatible with industrial implementations.

B) Example of Application of the Locking-on Phenomenon Disappearance Approach

Figure 3:
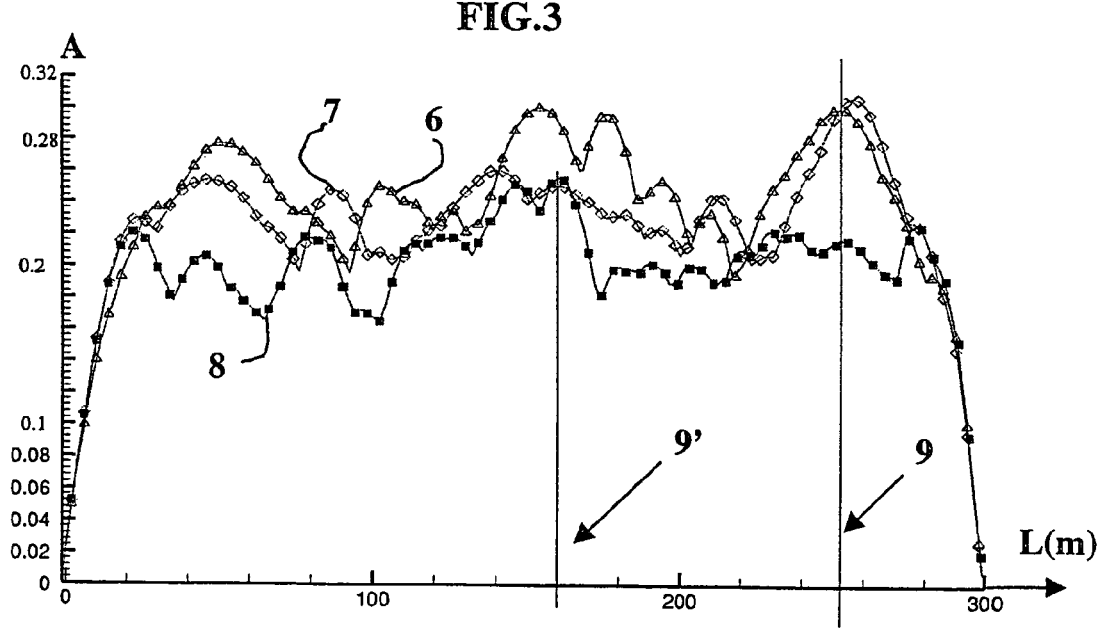
FIG. 3 shows the significance of a variant according to the invention.

In this case, a relative velocity/structure current is introduced, which depends on the time require for breaking the vortexes. According to the invention, a simple way consists in introducing a head motion in the plane of the riser and of the current. For example, on the riser defined above, a constant current is applied throughout the depth at 0.5 m/s and a sinusoidal motion is imposed at the riser head. The top of the riser thus has a velocity of $A\omega \sin(\omega t)$ type, where A is the amplitude of the motion and $\omega$ its circular frequency. FIG. 3 (obtained with the DeepFlow software described notably in the following publication: <<Numerical Simulation of Vortex-Induced Vibrations of Slender Flexible Offshore Structures>>—S. Etienne, F. Biolley, F. Fontaine, C. Le Cunff, J.-M. Heurtier, proceeding ISOPE 2001) shows on the ordinate the amplitude A (in meters) of the vibrations of a section located at a distance L (in meters) from the top of the riser. The frequency of the motion is varied and the vibration amplitudes obtained for three different values of $A\omega$ are compared in FIG. 3:

curve 6: $A\omega=0$ (m/s)
curve 7: $A\omega=0.3$ (m/s)
curve 8: $A\omega=0.4$ (m/s).

It is clear that the amplitude of the vibrations can be decreased by varying $A\omega$. The lifetime under fatigue conditions can thus be improved insofar as not too great vibrations are introduced at higher frequencies. Thus, in FIG. 3, in the case of a locked-on riser (curve 6), the maximum amplitude of the vibrations is considerably reduced at point 9. Location of the maximum amplitude is also modified by the presence of a head motion, and the new maximum, represented by 9', is lower than the maximum obtained without motion (curve 6).

Furthermore, it is clear that the optimum displacement velocities calculated can be obtained by means of industrial devices such as hydraulic jacks.

The invention thus allows to reduce the amplitude of the vortex-induced vibrations by actively imposing a displacement at the head of the riser.

Figure 4:
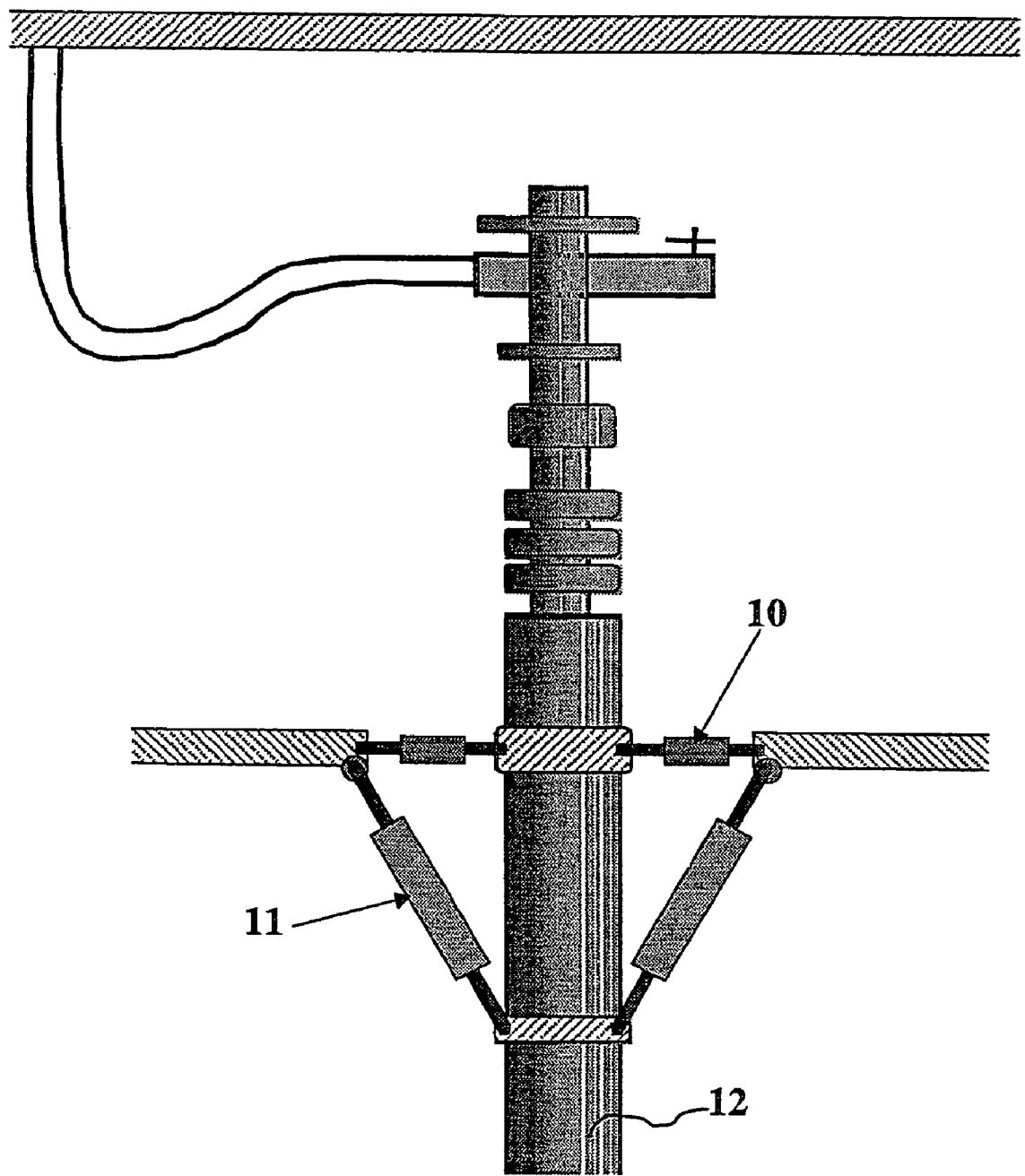
FIG. 4 diagrammatically shows an embodiment according to the invention.

FIG. 4 illustrates the means for suspending an upper end 12 of a riser. The vertical stresses are taken up by conventional tensioners 11, of hydraulic jack type for example. Mechanical actuators 10 (hydraulic jacks for example), whose mechanical behaviour can be passive or active, allow horizontal displacement of the riser head. Of course, tensioners 11 are suited to follow the horizontal displacement of the riser head. The stiffness, damping parameters, or the forces or displacements applied are selected to allow control of the VIV phenomenon by actuators 10.

Such an actuator system can also be coupled with riser vibration measuring devices and with current meters so as to allow optimum control of the VIVs. The control loop then involves a VIV computation model as described above, a model intended to best adjust the horizontal displacement parameters according to the riser vibrations.

It is also possible to use magneto-rheological (MR) fluids as components of spring/damper systems 10.

A magneto-rheological fluid is a dispersed composition (for example silicone oil+particles with magnetic properties) whose essential property is to have a modified rheological behaviour according to the presence of a magnetic field. Under the action of a magnetic field, the dispersed particles form aggregates or sorts of columns aligned in the direction of the field lines. When the system is subjected to small deformations, restoring forces exist between the particles which tend to bring the columns back into the direction of the field lines. However, beyond a certain critical deformation, the restoring force is not sufficient and the particles are carried along by the shear field. One thus changes from an elastic solid behaviour to a viscous liquid behaviour, with an intermediate viscoelastic behaviour. The intensity of the magnetic field, the particle volume fraction and the size of the particles are parameters which allow to modulate the response of the system (fluid flow).

Such fluids can then be advantageously used for making spring/damper systems 10 in cases where it would be desired to change the mechanical characteristics thereof, for example as a function of the current.

The invention claimed is:

1. A method of limiting vortex-indicated vibrations on the length of a riser subjected to substantially transverse fluid flow, said riser being suspended at one end from a support by displacement means allowing displacement of said end in a transverse direction in relation to the principal axis of said riser, comprising:

actively imposing a substantial sinusoidal motion to the end of the riser in a transverse direction in relation to the principal axis of the riser;

determining the stiffness and/or damping of said displacement means as a function of the vibrations induced; and adjusting the stiffness and/or damping of said displacement means by means of magneto-rheological fluids thereby controlling parameters of said sinusoidal motion as a function of the vibrations induced.

2. The method according to claim 1, wherein the displacement means is a hydraulic jack.

* * * * *